United States Patent

Harrell et al.

[11] Patent Number: 5,471,065
[45] Date of Patent: Nov. 28, 1995

[54] MACROENCAPSULATION OF HAZARDOUS WASTE

[76] Inventors: James L. Harrell, 216 Gunn St., Montgomery, Ala. 36124; James S. Hotard, Jr., 6628 Orleans Ave., New Orleans, La. 70128

[21] Appl. No.: 186,911

[22] Filed: Jan. 27, 1994

[51] Int. Cl.⁶ ................................................ G21F 5/00
[52] U.S. Cl. .................................. 250/506.1; 250/507.1
[58] Field of Search ............................... 250/506.1, 507.1

[56] References Cited

U.S. PATENT DOCUMENTS

| | | |
|---|---|---|
| 2,846,421 | 8/1958 | Pollock . |
| 2,974,367 | 3/1961 | Doering et al. . |
| 3,532,856 | 10/1970 | Collins . |
| 3,675,428 | 7/1972 | Watts . |
| 3,825,393 | 7/1974 | Bittner et al. . |
| 4,033,130 | 7/1977 | Hermans . |
| 4,062,347 | 12/1977 | Jensen . |
| 4,100,860 | 7/1978 | Gablin et al. . |
| 4,114,600 | 9/1978 | Newton . |
| 4,299,274 | 11/1981 | Campbell . |
| 4,509,590 | 4/1985 | Svetlik . |
| 4,525,100 | 6/1985 | Zawadzki, Jr. et al. . |
| 4,564,469 | 1/1986 | Cochet et al. . |
| 4,588,088 | 5/1986 | Allen . |
| 4,650,086 | 3/1987 | Morrison, Jr. . |
| 4,756,681 | 7/1988 | Unger et al. .................. 425/112 |
| 4,761,127 | 8/1988 | O'Brien et al. . |
| 4,859,395 | 8/1989 | Unger et al. .................. 264/254 |
| 4,932,853 | 6/1990 | Unger et al. .................. 425/112 |
| 4,934,283 | 6/1990 | Kydd . |
| 4,941,588 | 7/1990 | Flider .......................... 220/302 |
| 4,987,018 | 1/1991 | Dickinson ..................... 428/36.9 |
| 5,140,165 | 8/1992 | Kiuchi et al. . |
| 5,225,114 | 7/1993 | Anderson et al. .............. 250/507.1 |
| 5,231,938 | 8/1993 | Gore . |

*Primary Examiner*—Bruce C. Anderson

[57] ABSTRACT

A method and apparatus for hazardous waste disposal whereby a high density polyethylene containment unit is used for immobilizing hazardous waste material. A method for macroencapsulation of hazardous waste material by butt fusion bonding end caps onto a high density containment unit to form an on site integral containment unit. The hazardous waste material, located in 55 gallon drums, is macroencapsulated in a containment unit made of entirely of high density polyethylene.

27 Claims, 1 Drawing Sheet

MACROENCAPSULATION OF HAZARDOUS WASTE

FIELD OF THE INVENTION

The field of the invention is the storage of hazardous waste material, and more specifically the macroencapsulation of hazardous waste material for above or below ground storage.

BACKGROUND OF THE INVENTION

Due to an increase in cost and the associated decline in capacity of landfills, disposal of solid, hazardous, radioactive mixed, and low level radioactive wastes mandates efficient utilization of wastes. The disposal would be less costly if landfills were not part of the storage facilities. The capacity crisis has become a significant concern around the country, particularly in the Northeast where landfill sites are small in size and in numbers. According to EPA data (1986), for example, more than half of the existing landfills will reach their capacity within eight years. About 40% of the landfills involve less than ten acres and nearly 95% are smaller than 100 acres. Accordingly, about one third of all landfills receive less than 30 tons per day of waste and only 5% receive more than 500 tons. Privately owned cites represent approximately half of the country's remaining disposal capacity.

There are several methods of disposing of hazardous waste. Landfills have been used as bedding grounds but uncontrollable contamination problems have led communities to restrict landfills especially in highly populated areas. When toxic wastes are disposed of on land, contaminated liquid may drain and leak from the waste sites and pollute ground water. Likewise, land application techniques and deep well injection have the same drawbacks as landfills. Government regulations now require industry to find alternative technologies to replace landfilling as a method of disposing of hazardous wastes.

Incineration is an old method of disposing of waste. Unfortunately, volatile wastes eliminated this method of disposal as a consideration of disposing of hazardous wastes material. One problem with the incineration of industrial wastes arises from the necessity of a supplying a blended feed to the incinerator and to avoid large fluctuations in the burning characteristics of the waste. The requirement for blending implies that there be a fairly extensive, and segregated, storage system for the various types of waste. This storage facility must take into account the widely varying physical and chemical natures of the waste: in flammability, toxicity, corrosiveness, handleability and mutual compatibility with other wastes. The storage site of the operation, together with the laboratories and staff required for supervision and control purposes, can become complex and expensive. It is apparent that a well designed and managed incinerator facility for industrial waste can become expensive to build and operate. The problem of obtaining the necessary permits from federal and local regulatory agencies is formidable.

Finally, solidification techniques now offer the safest method of disposing of hazardous waste material. Encapsulation can be divided into two subdivisions: micro and macro. Microencapsulation attempts to seal each waste within a solid matrix while macroencapsulation is the process by which the matrix containing the waste is encapsulated. The costs of preparing a solid matrix are incredible in disposing of large amounts of hazardous waste material. Prior art methods of disposing of hazardous waste in sealed metal containers fail because of corrosion problems.

SUMMARY OF THE INVENTION

One embodiment of the present invention is method of storing a plurality of containers of hazardous waste material comprising the steps of providing a high density polyethylene containment unit, butt fusing an end cap onto one end of the unit, filling the unit with a plurality of drums filled with hazardous waste material and butt fusion bonding a second end cap onto the other end of the containment unit.

Another embodiment of the present invention is a method of macroencapsulation of hazardous waste material by filling a high density polyethylene containment unit with hazardous waste material and sealing the unit to form an integral hazardous waste storage unit.

A further embodiment of the present invention is microencapsulated containment unit having two end caps butt fusion bonded to create a sealed containment unit.

It is an object of the present invention to provide a new method for storing a plurality of drums of hazardous waste material.

A further object of the present invention is to provide a new method for macroencapsulating hazardous waste material with high density polyethylene to ensure against escape of containments.

Yet a further object of the present invention is to provide a method and containment unit for storing hazardous waste material which may be utilized on site while identifying and mummifying the material.

DETAILED DESCRIPTION OR THE INVENTION

Figure 1:
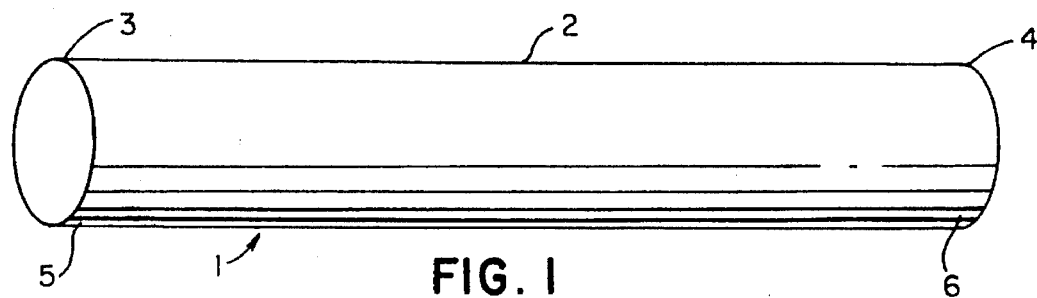
FIG. 1 is a perspective view of a containment unit.

The preferred embodiment of the present invention will be described in connection with hazardous waste materials particularly in the containment of radioactive hazardous waste. It is to be understood, however, that while specific materials, techniques and uses are described herein various modifications, equivalents and uses will be apparent to one skilled in the art and the invention is not confined to the preferred embodiment described.

A high density polyethylene unit is provided for immbolizing hazardous waste material. The outstanding resistance of the containment unit to chemicals make it suitable to contain/immobilize hazardous waste/chemicals or to be installed in an environment where these hazardous waste/chemicals are present. Factors that determine the suitability and service life of each particular application include the specific chemicals and its concentration, pressure, temperature, period of contact and service conditions which may introduce stress concentrations to the containment unit.

The containment unit is for all practical purposes, chemically inert within its temperature use range. The unit does not rot, rust, pit, corrode or lose wall thickness through chemical or electrical reaction with the surrounding soil, whether acid, alkaline, wet or dry. It neither supports the growth of, nor is affected by, algae, bacteria or fungi and is resistant to marine biological attack. The unit contains no ingredients that make it attractive to rodents, gophers, etc.

Most acids, bases and other chemicals can be contained or immobilized by the containment unit using the same design parameters as would apply to water, natural or manufactured gas and water solutions of inorganic salts. Strong oxidizing agents such as fuming sulfuric acid may effect the containment unit adversely, depending upon concentration, temperature and period of contact. In many cases, these chemicals can be handled through dilution. Some chemicals, such as all types of liquid hydrocarbons, will absorb into the wall of the pipe and cause a reduction in hoop stress but this does not degrade the material.

The hydrostatic design basis for the containment unit is based on extensive hydrostatic testing data evaluated by standardized industry methods and conducted by Phillips Petroleum Company. Life expectancy is estimated conservatively to be in excess of 100 years for transporting water at ambient temperature (73 grades Fahrenheit). Internal and external environmental conditions for each application may alter the expected life for change the recommended design basis to achieve the same life expectancy. These conclusions are supported by more than twenty-five years actual experience.

Each containment unit is light weight weighing 31.29 lbs/foot or 657 lbs/unit. The unit is 70–90% lighter than concrete, cast iron or steel, making it easy to handle and encapsulate. Substantial savings can be realized by reduced manpower and equipment requirements.

The unit has an extremely smooth inside surface and maintains excellent flow properties throughout its service life due to its excellent chemical and abrasion resistance. Smooth and non-wetting walls make the encapsulation of metal drums quick and easy.

The overall "toughness" of the containment unit is an important characteristic that derives from many of the chemical and physical properties of the material as well as the extrusion method. The containment unit is not brittle but is ductile. The unit flexes and bends and absorbs impact loads over a wide temperature range of −180 F. degrees up to its softening temperature of 260 F. degrees. This inherent resiliency and flexibility allow the unit to absorb surge pressures, vibration and stresses. The unit can be deformed without permanent damage and with no adverse effect on long term service life. The unit is flexible for contouring to installation conditions. The toughness of the unit is one of its outstanding engineering characteristics leading to innovative macroencapsulation design.

The expansive force of waste freezing inside the unit will not damage it. The unit is protected against degradation that could be caused by ultra-violet rays when exposed to direct sunlight. The material contains 2½% finely divided carbon black which also accounts for the black color of the unit. Carbon black is the most effective single additive capable of enhancing the weathering characteristics of the unit. The protection that even relatively low levels of carbon black impart to the unit is so great it is not necessary to use other light stabilizers or UV absorbers.

Weatherability tests indicate that the unit can be safely stored outside in most climates for periods of over 100 years without danger of loss of physical properties due to UV exposure. The exposure of the unit to normal changes in temperature does not cause degradation of the material. However, some of the physical and chemical properties of the unit will change as temperature is increased or decreased.

The unit will start to melt and soften at about 260 F. degrees. A temperature range of 475–500 F. degrees is used to fusion join the unit and cap. The unit is fabricated at about the same temperature. To protect the material against degradation at the higher melt temperature, it has been stabilized. This stabilizer protects the material against thermal degradation that might otherwise occur during manufacture, outside storage or installation.

The high density polyethylene resin that makes up the unit has been tested for thousands of hours at elevated temperatures of 140 F. degrees and 176 F. degrees without thermal degradation, as shown in table 1:

TABLE 1

| Time | Hoop | Stress, psi |
|---|---|---|
| 100,000 hrs. | (11.43. yrs) | 1635 |
| 438,000 hrs. | (50 yrs.) | 1604 |
| 500,000 hrs. | (57 yrs.) | 1601 |
| 1,000,000 hrs. | (114 yrs.) | 1586 |

Low-level radioactive containment and immobilization has always been a very important concern in the nuclear energy field. Human and environmental safety has required that this waste be controlled and immobilized. The use of concrete and metals have been only satisfactory in addressing economic, as well as safe long-term immobilization of low-level radioactive waste. Metal, specifically metal drums, are a short-term unsafe solution due to its susceptibility to deterioration and corrosion by the combination of time and weather, increasing hazardous exposures to humans and the environment.

The unit, made up of a versatile engineering material, is an efficient immobilizer with structural integrity. The unit is made entirely of high density polyethylene from Phillips 66 MARLEX (a registered trademark) resin. This resin has the highest concentration of hydrogen atoms among plastics. The unit, made up of Phillips "MARLEX" resin of carbon and hydrogen, is in itself a neutron moderator and an excellent containment and immobilizing material. The irradiation causes some strengthening of the unit. Crosslinking predominates over chain scission in polyethylene. The plastic properties are changed in accordance with the extent of irradiation. The effects of neutron irradiation on polyethylene has been fully evaluated by Phillips 66 Company and the Plastics Technical Center. Considering the time factor, low-levels of radiation over a long period of time (100 plus years) have no effect on the integrity of the unit.

Figure 2:
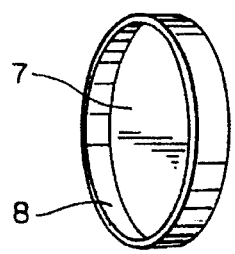
FIG. 2 is a perspective view of an end cap.
Figure 3:
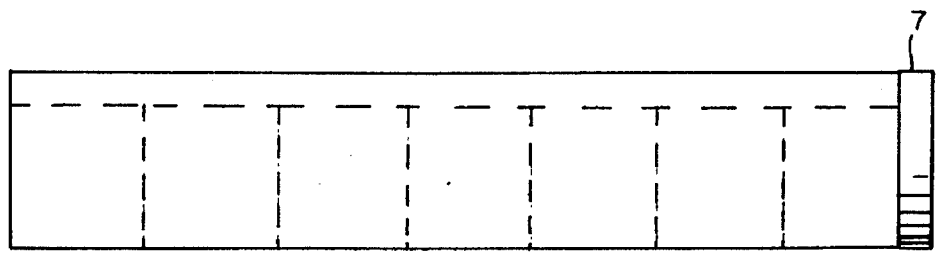
FIG. 3 is a perspective view of the containment unit filled with drums of hazardous waste material and sealed with end caps.

As described in detail above and now illustrated in FIG. 1, a high density polyethylene, tubular shaped containment unit 1 is used to store hazardous waste material. The unit utilizes a pipe 2 sold under the trademark Driscopipe owned and manufactured by Phillips Driscopipe, Inc. The pipe has two outer ends 3, 4 with outer edges 5, 6. FIG. 2 illustrates an end cap 7 having an inner lip 8. The end cap is made from the same material as the pipe. The end cap 7 is positioned on one end of the unit 1 and fusion bonded to the capsule using a McElroy fusion machine. A fusion bonding technique, butt fusion bonding, is used to seal one end of the containment unit. The containment unit 1 has an outer edge 5 that mates with the lip 8 during the fusion process. The bond is formed during the fusion process. The butt fusion process forces the polymeric chains of the lip material to physically link with the chains of the containment unit to create an integral bond.

The process of joining one cap to the containment unit will now be described in detail. Using the McElroy machine, which applies heat and pressure, the outer edge 6 of the containment unit is first heated to a near melting point. Next, the end cap is heated only at the lip area and then both the edge area and the lip are again heated and pressed together to form an integral seal.

Figure 4:
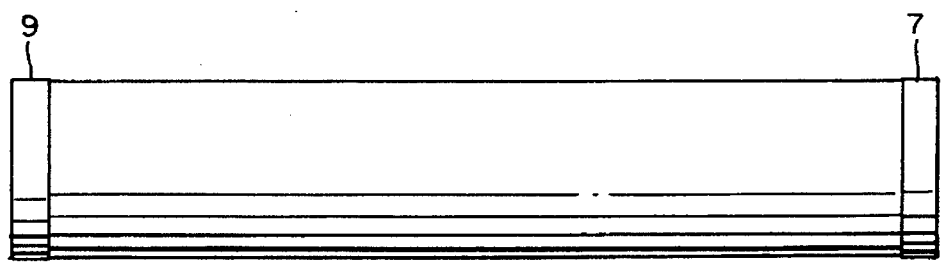
FIG. 4 is a perspective view of the end cap bonded to the containment unit.

After the end cap 7 is bonded to the containment unit 1, the unit is ready to receive hazardous waste material. In the preferred embodiment, hazardous waste material is stored in 55 gallon metal drums. The drums are made of highly corrosive metal which under normal conditions are subject to rusting and leaking. Each drum is slid horizontally into the open end of the unit until the unit is filled with up to seven drums. The high density polyethylene provides a low friction surface which allows the drums to slide easily on the surface. As illustrated in FIG. 4, a second end cap 9 is then used to seal the open end of the capsule using the butt fusion bonding technique described above. The result is a completely macroencapsulated unit for mummifying hazardous waste material. The lip seal creates a joint that is indistinguishable, in material properties, from the original components. Once the containment unit is sealed and cooled, the unit is stacked in pyramid formation for permanent or temporary storage.

Figure 5:
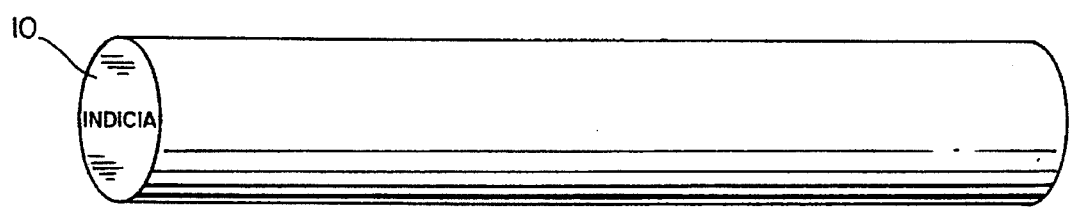
FIG. 5 is a perspective view of the containment unit illustrating indicia.

As illustrated in FIG. 5 the polyethylene material may be permanently marked by thermally Stamping into the shell and/or end caps with the content, date of closure or other indicia 10. The indicia 10 is effective to maintain an inventory in above ground storage facilities.

The high density polyethylene containment unit is an extremely effective storage facility for depleted uranium, radioactive lead, lead, and lead residual. The containment unit may be used by lead producers, battery producers or car battery reclaimers for use in landfill operations or above ground storage sites. The unit will not leak even if the contents of the drums leaks from within the unit.

We claim:

1. A method of encapsulating hazardous waste material, said method including the steps of:

providing a high density polyethylene unit having a first open end and a second open end;

positioning said hazardous waste material within said unit by heating said end cap at a lip area, heating an outer edge of the containment unit to a near melting point, reheating the outer edge of the containment unit and the end cap lip area again and pressing the end cap and the containment unit together to form an integral seal and, butt fusing a second sealing end cap on said second open end to encapsulate said hazardous material within said unit.

2. The method of encapsulating hazardous waste material as recited in claim 1, wherein said hazardous waste material is lead.

3. The method of encapsulating hazardous waste material as recited in claim 1, wherein said hazardous waste material is radioactive.

4. The method of encapsulating hazardous waste material as recited in claim 1, wherein said hazardous waste material is depleated uranim.

5. The method of encapsulating hazardous waste material as recited in claim 1, wherein said hazardous waste material is battery acid.

6.. The method of containing hazardous waste material as recited in claim 5, said method further including the steps of encapsulating at least seven drums and stacking said units in a pyramid shape for permanent storage.

7. The method of encapsulating hazardous waste material as recited in claim 1, wherein said containment unit acts to shield said hazardous waste material.

8. The method of encapsulating hazardous waste material as recited in claim 1, wherein said hazardous waste material is nuclear waste.

9. The method of containing hazardous waste material as recited in claim 8, said method further including the steps of stamping said unit with identifying indicia.

10. The method of macroencapsulating hazardous waste material as recited in claim 9, said method further including the step of using a McElroy fusion machine to butt fusion bond said end caps to said containment unit.

11. The method of containing hazardous waste material as recited in claim 8, said method further including the steps of first heating said vessel, secondly heating said end caps, thirdly heating said unit and said end caps simulatimously while applying pressure to bond said end caps to said unit.

12. The method of claim 1,, further comprising the steps of heating said unit, heating said cap and joining said unit and said cap.

13. A method of encapsulating hazardous waste material stored in 55 gallon drums, said method comprising:

providing a high density polyethylene tubular unit, filling said apparatus with at least seven drums, butt fusion welding an end cap on one end of said unit, and butt fusion welding a second end cap on said opposite end of said apparatus by heating said end cap at a lip area, heating an outer edge of the containment unit to a near melting point, reheating the outer edge of the containment unit and the end cap lip area again and pressing the end cap and the containment unit together to form an integral seal to encapsulate said hazardous waste material.

14. A method of encapsulating hazardous waste comprising:

providing a tubular high density polyethylene unit, said unit having a first end and a second end, filling said apparatus with at least one 55 gallon drum of hazardous waste material, sealing said first end of said apparatus by butt fusion welding an end cap onto said first end of said apparatus by heating said end cap at a lip area, heating an outer edge of the containment unit to a near melting point, reheating the outer edge of the containment unit and the end cap lip area again and pressing the end cap and the containment unit together to form an integral seal and sealing said second end of said apparatus by butt fusion welding an end cap onto said second end of said apparatus to encapsulate said hazardous waste material.

15. The method of macroencapsulating hazardous waste material as recited in claim 14, said method further including the steps of butt fusion bonding said inner lips of said end caps to said outer surface of said containment unit.

16. The method of macroencapsulating hazardous waste material as recited in claim 14, said method further including the step of stamping indicia on at least one end cap.

17. The method of macroencapsulating hazardous waste material as recited in claim 14, said method further including the step of stamping indicia on said outer surface of said containment unit.

18. The method of macroencapsulating hazardous waste material as recited in claim 14, said method further including the steps of heating said containment unit on said outer surface and heating said end caps on said lip.

19. The method of macroencapsulating hazardous waste material as recited in claim 14, wherein said hazardous waste material is lead.

20. The method of macroencapsulating hazardous waste material as recited in claim 14, wherein said hazardous waste material is radioactive.

21. The method of macroencapsulating hazardous waste material as recited in claim 14, wherein said hazardous waste material is depleated uranum.

22. The method of macroencapsulating hazardous waste material as recited in claim 14, wherein said hazardous waste material is battery acid.

23. The method of macroencapsulating hazardous waste material as recited in claim 14, wherein said containment unit acts to shield said hazardous waste material.

24. The method of macroencapsulating hazardous waste material as recited in claim 14, wherein said hazardous waste material is nuclear waste.

25. A method of containing hazardous waste material sealed in metal drums including the steps of:

providing tubular high density polyethylene unit, inserting said drums in said unit, sealing one end of said unit by butt fusion bonding an end cap on one end of said unit by heating said end cap at a lip area heating an outer edge of the containment unit to a near melting point, reheating the outer edge of the containment unit and the end cap lip area again and pressing the end cap and the containment unit together to form an integral seal and sealing an opposite end of said unit by butt fusion bonding a second end cap on said opposite end of said unit to encapsulate said hazardous waste.

26. A method of containing hazardous waste material, said method further including the steps of:

providing a pipe made of high density polyethelyene material, providing two end caps made of high density polyethelyene material, butt fusion bonding an end cap to a first end of said unit by heating said end cap at a lip area, heating an outer edge of the containment unit to a near melting point, reheating the outer edge of the containment unit and the end cap lip area again and pressing the end cap and the containment unit together to form an integral seal filling said unit with hazardous waste material, and butt fusion bonding said other end cap to said opposite end of said unit.

27. A method of macroencapsulating hazardous waste material, said method comprising the steps of:

providing a high density polyethylene containment unit having two ends, said each end having a outer surface, providing two high density polyethylene end caps each cap having an inner lip, butt fusion bonding one end cap onto a first end of said containment unit by heating said end cap at a lip area, heating an outer edge of the containment unit to a near melting point, reheating the outer edge of the containment unit and the end cap lip area again and pressing the end cap and the containment unit together to form an integral seal filling said containment unit with containers of hazardous waste material;

butt fusion bonding a second end cap onto a second end of said containment unit to macroencapsulate said hazardous material in said containment unit.

\* \* \* \* \*